United States Patent [19]
Wegert

[11] 4,320,673
[45] Mar. 23, 1982

[54] CONTROL DEVICE FOR AN AUTOMATIC DRIVE OF AN AUTOMOBILE

[75] Inventor: Friedrich Wegert, Ditzingen, Fed. Rep. of Germany

[73] Assignee: Dr. Ing. h.c.F. Porsche Aktiengesellschaft, Stuttgart, Fed. Rep. of Germany

[21] Appl. No.: 105,927

[22] Filed: Dec. 21, 1979

[30] Foreign Application Priority Data

Dec. 23, 1978 [DE] Fed. Rep. of Germany ....... 2855525

[51] Int. Cl.³ .................... B60K 41/04; G05G 1/14; G05G 1/08
[52] U.S. Cl. .................... 74/865; 74/501 R; 74/506; 74/513; 74/877; 74/878
[58] Field of Search ............ 74/501 R, 506, 513, 74/865, 877, 878, 843, 872, 873, 874, 875

[56] References Cited

U.S. PATENT DOCUMENTS

| | | | |
|---|---|---|---|
| 1,652,759 | 12/1927 | Camp | 74/506 |
| 2,071,695 | 2/1937 | Hyde | 74/513 |
| 2,271,663 | 2/1942 | Rubissow | 74/513 |
| 2,767,594 | 10/1956 | Du Shane | 74/874 X |
| 2,947,191 | 8/1960 | Waner | 74/875 X |
| 3,134,269 | 5/1964 | Shimanckas | 74/878 X |
| 3,498,156 | 3/1970 | McAllister et al. | 74/513 X |
| 3,698,372 | 10/1972 | Eshelman | 74/513 |
| 3,757,603 | 9/1973 | Cattin et al. | 74/513 |
| 3,760,786 | 9/1973 | Marsh | 74/513 X |
| 4,041,797 | 8/1977 | Mito | 74/513 |
| 4,194,609 | 3/1980 | Du Bois | 74/878 X |

FOREIGN PATENT DOCUMENTS

| | | | |
|---|---|---|---|
| 1061198 | 7/1959 | Fed. Rep. of Germany | 74/877 |
| 1223911 | 6/1960 | France | 74/872 |

OTHER PUBLICATIONS

Revue Technique Automobile No. 382, p. 187.

Primary Examiner—Leslie Braun
Attorney, Agent, or Firm—Craig and Antonelli

[57] ABSTRACT

A control device for an automatic drive of an automobile having an adjusting device that is actuatable by an accelerator pedal comprising a deflector roll with which transmission means for a slide unit of the drive and for a spring-loaded throttle valve of an internal combustion engine are connected. The transmission means includes a cable that is connected to the adjusting device and is led to the slide unit and to the accelerator pedal. The cable is held in the deflector roll by a securing means. The transmission means is also connected with a rotatable actuator lever for the throttle valve. According to a preferred embodiment, the deflector roll has a guide groove for the cable and a recess in which a clamping sleeve is fastened to the cable, the clamping sleeve being held within the recess under the tensioning of the cable, whereby the clamping sleeve is released from the recess upon a rupturing of the cable. The arrangement prevents damage to the automatic drive that could occur if the engine was permitted to race during actuation of the accelerator pedal with the automatic drive in an idle setting.

6 Claims, 2 Drawing Figures

CONTROL DEVICE FOR AN AUTOMATIC DRIVE OF AN AUTOMOBILE

BACKGROUND AND SUMMARY OF THE INVENTION

The invention relates to a control device for an automatic drive of an automobile with an adjusting device actuatable by the accelerator pedal, said device comprising a deflector roll with which transmission means for a slide unit of the drive and for a spring-loaded throttle valve of the engine are connected.

A control device for an automatic drive is known (Revue technique automobile no. 382 p. 187) in which, via a setting device actuatable by the accelerator pedal, the throttle valve of the engine is actuatable by a cable, and the slide unit of the drive is actuatable by another cable. These two cables have clamping sleeves at their ends for fastening in a deflector roll that is a component of the setting device, said clamping being suspendable in roll recesses.

In case of a break in the cable that leads from the setting device, to the slide unit of the drive, the automatic drive assumes the idling setting of the throttle valve and the band brakes and lamellar couplings of the drive are loosened. If now the accelerator pedal is actuated, the engine races and this increased rpm is taken to the drive input shaft. Frictional heat is developed by the loosened band brakes and couplings looping about the drive shaft, whereby the automatic drive is locked and damaged.

The invention concerns the problem of producing a control device of the type in question, whereby these disadvantages are avoided.

This problem is solved according to features of the invention as described herein.

The advantages deriving from the invention include the fact that if the cable breaks, especially between the slide unit and the fastening point on the deflector roll, the throttle valve automatically swings into the idling position. Actuation of the accelerator pedal thus can have no further effect on the throttle valve and the engine. The engine, despite actuation of the accelerator pedal, remains at the idling rpm, and damage to the automatic drive can be avoided.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
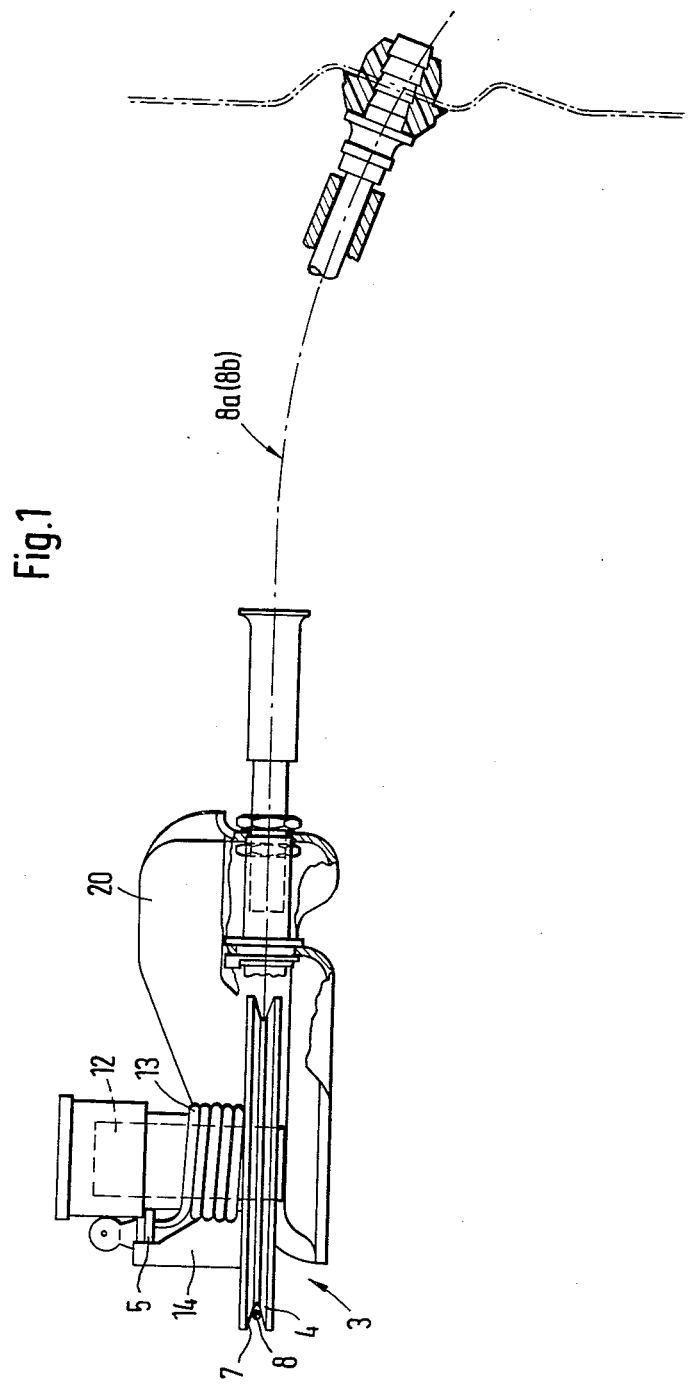
FIG. 1 shows a top view of a control device in accordance with a preferred embodiment of the invention.

A setting device 3 is provided between a slide unit of an automatic drive 1 and an accelerator pedal 9. This setting device 3 comprises a deflector roll 4 with an actuator lever 5 for a throttle valve 6 of the internal combustion engine, which is only represented in FIG. 1.

The setting device 3 is held on a bracket 20 in the engine compartment of the vehicle.

The deflector roll has a groove 7 that receives a cable, and in which a cable 8 is guided from the accelerator pedal 9 to the slide unit of drive 1. In this roll 4, a recess 10 is provided for fastening cable 8 in groove 7. Cable 8 is locked in the recess by means of a clamping sleeve 11. If clamped cable 8 is ruptured, clamping sleeve 11 can jump out of recess 10.

Figure 2:
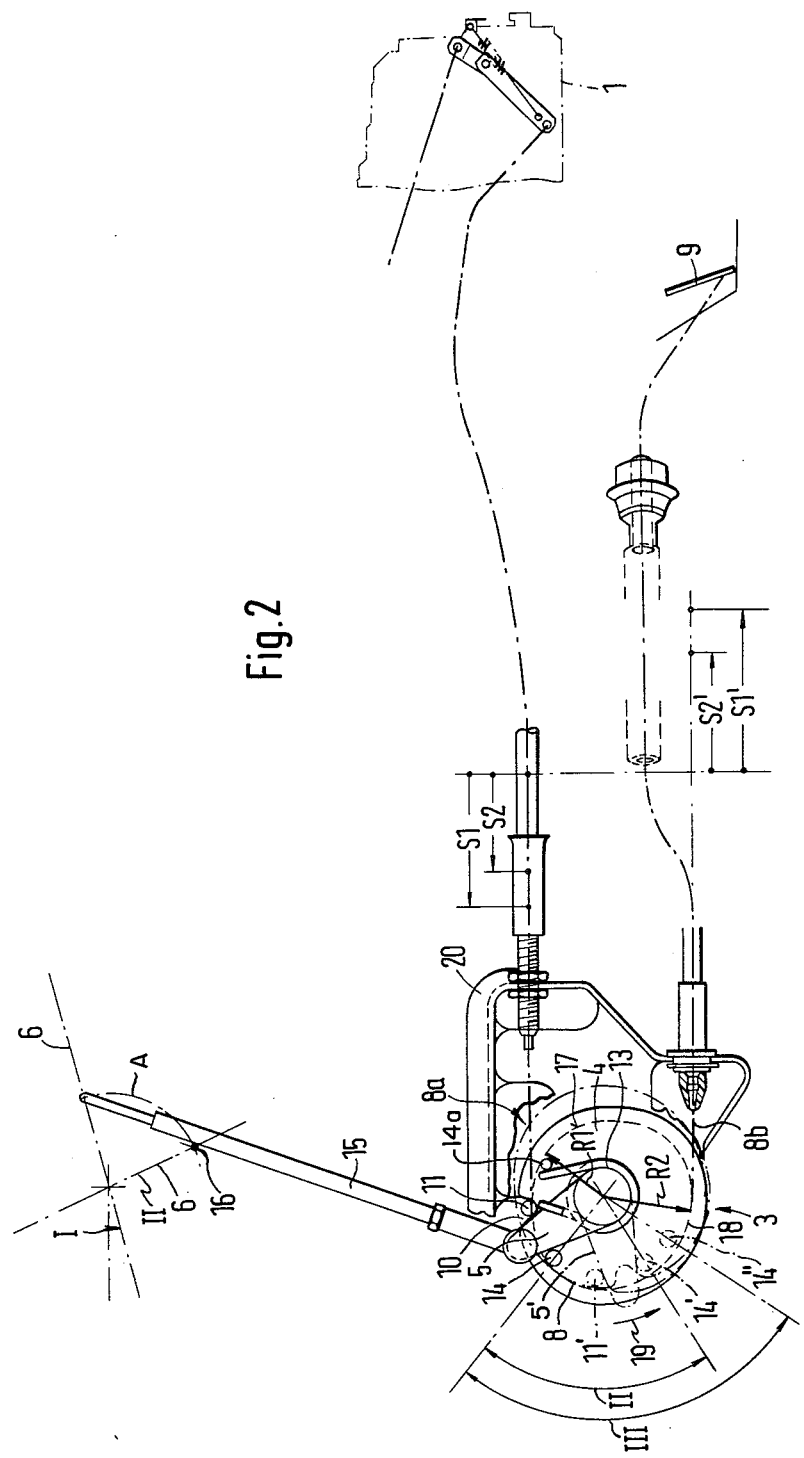
FIG. 2 is a side view of the FIG. 1 arrangement in the idling setting.

Actuator 5 extends radially to the deflector roll 4, is rotatably disposed on a bearing pin 12 of roll 4, and is in engagement with a spring 13. Spring 13 is mounted with one end engaging lever 5 and at another end a stop 14a on roll 4 with the effect that it holds lever 5 against a stop 14 of deflector roll 4, whereby the lever 5 nonetheless is still movable relative to deflector roll 4 away from stop 14 by compressing spring 13 toward stop 14a. At the free end of actuator lever 5 there is an articulatedly held rod 15 that is connected with throttle valve 6. Throttle valve 6 is spring loaded (by an unillustrated spring in a direction toward idle setting I), directly adjustable via lever 5, and can assume a position between an idling setting I and a full throttle setting II along path A (FIG. 2). In the full throttle setting II, throttle valve 6 is maximally opened, and is applied against a stop 16.

Guide groove 7 of deflector roll 4 has two different radii R1 and R2 that go over from one to the other and constitute a continuous guide groove 7 with a curved course. The smaller radius R1 of guide groove 7 is provided in a region 17 of roll 4 that receives the end 8a of cable 7 that is guided to the slide unit of the drive. On the other hand, the larger radius R2 of guide groove 7 is provided in a region 18 of roll 4 that receives end length 8b of cable 8, which is taken to accelerator pedal 9. This guide groove 7 with its different curved course is needed so that paths S2 and S2' which are of different lengths for actuation of throttle valve 6, e.g. for full throttle setting II of the side unit of drive 1, can be negotiated. Thus path S2' that cable length 8b negotiates up to the position of throttle valve 6 in the full throttle setting II is longer than the path S2 of the cable length 8a, for control of the slide unit of drive 1. Also, assumption of the kick-down position III requires different paths S1 and S1' for cable lengths 8a and 8b.

The control of automatic drive 1 is effected via the slide unit in the following way. Lever 5 with rod 15 controls the opening and closing of throttle valve 6. The said lever 5 is carried along by deflector roll 4 which in turn is rotated by cable 8 that connects accelerator pedal 9 and automatic drive 1 according to switch technique. The rotation of deflector roll 4 by cable 8 occurs from the friction between the roll and the cable as well as clamping piece 11 on cable fixed on deflector roll 4. Cable length 8a going off from drive unit 1 turns with the smaller radius R1 in region 17 of guide groove 7. The other cable length 8b going to the accelerator pedal 9 turns with the larger radius R2 in region 18 of guide groove 8. Actuator lever 5 is carried along via spring 13 by the deflector roll (to the position shown with dot-and-dash lines at 5', 11', 14' in FIG. 2), and during this process it is pressed by spring 13 against stop 14 on roll 4.

With actuation of the kick-down device of drive 1, by suitable depression of the accelerator pedal, deflector roll 4 is turned out beyond the full load setting II in direction 19 (to position 14" outlined in FIG. 2). Actuator lever 5 then lifts off from the end stop 14 on roll 4 and moves relative to the deflector roll 4 against the action of spring 13, whereby lever 5 remains in the 5' position as throttle valve 6 bears on end stop 16.

If cable 8 ruptures, it hangs out of roll 4 which turns automatically with lever 5, against the direction of rotation 19, so that throttle valve 6 assumes its closed idling position I. Turning of roll 4 is effected by the spring (not shown) in throttle valve 6. Because of the lack of transmitting means from the accelerator pedal to the drive slide unit, no further actuation of throttle valve 6 and the slide unit is possible when there is a break in the cable.

While I have shown and described one embodiment in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Control device for an automatic drive for an automobile comprising:
    a setting device having a rotatable deflector roll with an actuator lever connected to a throttle valve; and
    a transmission cable extending from a first end connected with an accelerator pedal over said deflector roll to a second end connected with a slide unit of the automatic drive;
    wherein said transmission cable is provided with securing means releasably held in the deflector roll under tensioning of said transmission cable, whereby said securing means is released from said deflector roll upon rupture of said cable and damage to the automatic drive is prevented by said throttle valve being rendered inoperative in response to the accelerator pedal.

2. Device as in claim 1, characterized in that the actuator lever is held on the deflector roll on a bearing pin and is biased by a spring, said actuator lever being displaceable toward a position of closure of the throttle valve and applied against a stop of the deflector roll under action of said spring.

3. Device as in claim 1 or 2, characterized in that the actuator lever is movable relative to the deflector roll between the stop and the spring.

4. Device as in claim 3, characterized in that the deflector roll has a guide groove for the cable and a recess, said securing means being a clamping sleeve fastened to the cable that is held in said recess.

5. Device as in claims 1 or 2, characterized in that the deflector roll has a guide groove for the cable and a recess, said securing means being a clamping sleeve fastened to the cable that is held in said recess.

6. Device as in claim 5, characterized in that the guide groove for the cable has two different radii that run into each other, whereby the guide groove is provided with a smaller radius for a first cable length that extends from the deflector roll to the slide unit, and a larger radius in a region of the deflector roll receiving a second cable length that runs from the deflector roll to the accelerator pedal.

* * * * *